United States Patent
Kwon

(10) Patent No.: US 6,229,989 B1
(45) Date of Patent: May 8, 2001

(54) METHOD OF CONTROLLING POWER SUPPLIED TO RF RECEIVER AND PAGING RECEIVER EMPLOYING THE SAME

(75) Inventor: Tae-Youn Kwon, Yongin (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/111,307

(22) Filed: Jul. 7, 1998

(30) Foreign Application Priority Data

Oct. 8, 1997 (KR) .................................. 97-51531

(51) Int. Cl.⁷ .............................. H04Q 7/32; H04Q 7/14
(52) U.S. Cl. ..................... 455/38.3; 455/38.1; 455/31.2; 455/31.3; 455/343; 455/574; 340/825.44
(58) Field of Search ................................... 455/38.3, 38.1, 455/31.2, 31.3, 38.2, 343, 574, 422, 550, 572, 32.1; 340/825.44

(56) References Cited

U.S. PATENT DOCUMENTS

| | | | |
|---|---|---|---|
| 5,382,949 | * | 1/1995 | Mock et al. ....................... 455/38.3 |
| 5,384,564 | * | 1/1995 | Wycoff et al. ...................... 455/38.3 |
| 5,459,457 | * | 10/1995 | Sharpe ................................ 455/38.3 |
| 5,566,081 | * | 10/1996 | Yoshizawa et al. ................. 455/38.3 |
| 5,649,315 | * | 7/1997 | Eaton ................................. 455/38.3 |

* cited by examiner

Primary Examiner—William G. Trost
Assistant Examiner—Keith Ferguson
(74) Attorney, Agent, or Firm—Dilworth & Barrese, LLP

(57) ABSTRACT

A method for controlling the power supplied to an RF receiver in a paging receiver is provided. The method includes the step of synchronizing the paging receiver with a paging system which periodically transmits paging data at specified repetitive intervals. The paging data includes preamble data followed by batch data. Power is then periodically supplied to the RF receiver at the specified repetitive intervals. When the RF receiver is being supplied with the power, it is determined whether the RF receiver is receiving the preamble data. If the RF receiver is receiving the preamble data, then self frame data is detected from the batch data Next, it is checked whether information indicating an end of the batch data is being received. If the information is being received, then the power supplied to the RF receiver is cut off.

11 Claims, 4 Drawing Sheets

METHOD OF CONTROLLING POWER SUPPLIED TO RF RECEIVER AND PAGING RECEIVER EMPLOYING THE SAME

BACKGROUND OF THE INVENTION

1. Field of the Invention

The present invention relates to paging receivers, and more particularly, to a method for controlling the power supplied to an RF (Radio Frequency) receiver in a paging receiver.

2. Description of the Related Art

A paging receiver uses a battery as a power source. Thus, in order to minimize power dissipation, the paging receiver supplies power to an RF receiver in the paging receiver on a periodic (non-continuous) basis.

In a conventional paging system, paging data is asynchronously transmitted in POCSAG code. Section A of FIG. 1 is a waveform diagram of the paging data, which consists of preamble data PD and batch data BD. The preamble data PD is a reversal code which switches between "1" and "0" during 576 bits, and enables the paging receiver to detect the asynchronously transmitted paging data. The batch data BD consists of a plurality of batches, each having a sync code for synchronizing a codeword and a plurality of frame data. As shown, the paging system transmits the paging data in irregularly alternating intervals (asynchronously).

In order to minimize power dissipation and facilitate failure free reception of paging data from the paging system, the paging receiver blocks (cuts off) power to the RF receiver for a specific time interval (ΔT) which is less than the transmission time interval for the preamble data PD. Then, the paging receiver supplies (unblocks) power to the RF receiver for a predetermined time interval during which the RF receiver can receive the transmitted data and check whether the received data is preamble data PD. That is, the paging receiver repeatedly blocks and supplies power to the RF receiver for the time AT and the predetermined time, respectively.

Section B OF FIG. 1 is a waveform diagram illustrating the state (i.e., blocked or unblocked) of the power supplied to the RF receiver in the paging receiver. The high state of the waveform of FIG. 1B corresponds to the paging receiver supplying power (unblocked) to the RF receiver, and the low state corresponds to the paging receiver blocking power to the RF receiver. The paging receiver decodes the data received from the RF receiver and then, judges whether or not the received data is preamble data PD. If the decoded data is preamble data PD, the paging receiver drives (sets) the RF receiver in (to) a batch mode in order to enable the RF receiver to receive the batch data following the preamble data PD. However, if the decoded data is not preamble data PD, the paging receiver continues to check whether or not preamble data PD is being received, while repeatedly supplying and blocking power to the RF receiver.

It is to be appreciated that since the paging system transmits paging data asynchronously, the paging receiver cannot predict when paging data is going to be transmitted in order to timely supply power to the RF receiver. Therefore, in order to facilitate failure free reception of the paging data transmitted from the paging system, the conventional paging receiver periodically supplies power to the RF receiver for a specific time interval (ΔT) which is shorter than the transmission time interval for the preamble data PD, including during an idle interval where the paging system does not transmit paging data. Accordingly, even when the paging system does not transmits paging data, the paging receiver supplies power to the RF receiver unnecessarily, thereby wasting power.

SUMMARY OF THE INVENTION

It is therefore an object of the present invention to provide a method for minimizing the power dissipation of an RF receiver in a paging receiver.

To achieve the above and other objects, there is provided a method for controlling the power supplied to an RF receiver in a paging receiver. The method includes the step of synchronizing the paging receiver with a paging system which periodically transmits paging data at specified repetitive intervals. The paging data includes preamble data followed by batch data. Power is then periodically supplied to the RF receiver at the specified repetitive intervals. When the RF receiver is being supplied with the power, it is determined whether the RF receiver is receiving the preamble data. If the RF receiver is receiving the preamble data, then self frame data is detected from the batch data Next, it is checked whether information indicating an end of the batch data is being received. If the information is being received, then the power supplied to the RF receiver is cut off.

These and other objects, features and advantages of the present invention will become apparent from the following detailed description of illustrative embodiments thereof, which is to be read in connection with the accompanying drawings, where the same reference numerals are used to represent the same functional elements.

DETAILED DESCRIPTION OF PREFERRED EMBODIMENTS

A preferred embodiment of the present invention will be described in detail hereinbelow with reference to the accompanying drawings. In the following description, numerous specific details are set forth to provide a more thorough understanding of the present invention. It will be apparent, however, to one skilled in the art that the present invention may be practiced without these specific details. In other instances, well known functions or constructions have not been described so as not to obscure the present invention.

Initially, it is to be appreciated that in a paging system according to the present invention, paging data is synchronously transmitted. Further, in the illustrative embodiment of the invention, the paging system transmits paging data precisely every minute. This is shown in section A of FIG. 4, which is a waveform diagram illustrating paging data according to the present invention. In section A of FIG. 4, n' corresponds to the number of elapsed minutes and 00"

corresponds to the number of elapsed seconds, i.e., n' 00"(n minutes and 0 seconds), (n+1)' 00", (n+2)' 00", (n+3)' 00", and so on.

Figure 1:
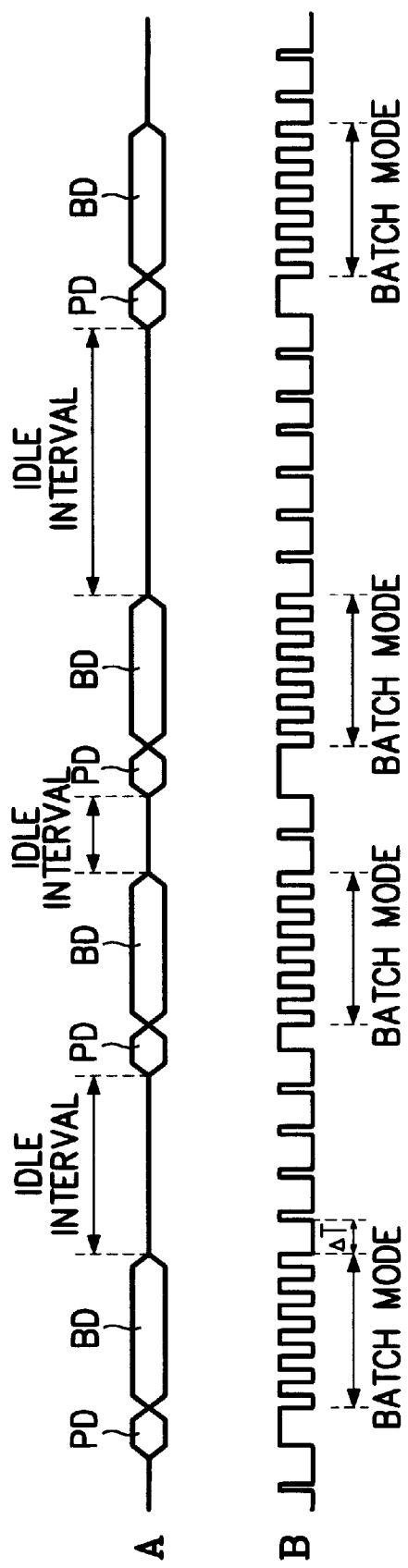
FIG. 1 shows are waveform diagrams illustrating paging data (section A), and the state of the power supplied to an RF receiver in a paging receiver (section B), according to the prior art.
Figure 2:
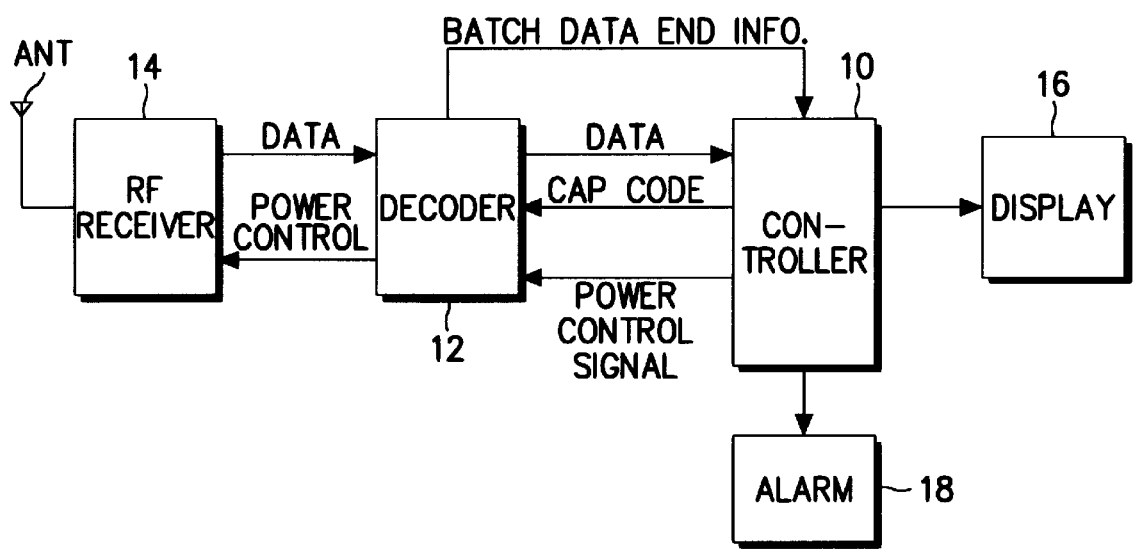
FIG. 2 is a block diagram of a paging receiver according to an embodiment of the present invention.

Referring back to FIG. 2, a paging receiver according to the present invention is shown. The paging receiver receives the paging data synchronously transmitted from the paging system, as stated above. An RF receiver 14 amplifies a weak RF signal received through an antenna ANT at a specified channel, frequency-shifts the amplified RF signal to the original frequency band to demodulate it, and then reshapes the demodulated signal. A decoder 12 detects preamble data from the data outputted from RF receiver 14. The decoder also decodes batch data following the preamble data in order to detect frame data from the batch data based on a CAP code provided from a controller 10. The detected frame data is then provided to the controller 10. Further, in case an all-high or all-low pattern is generated at the sync code position of the batch data, decoder 12 provides controller 10 with end information of the batch data to recognize the end of the batch data. Additionally, decoder 12 connects or disconnects a power supplying path to RF receiver 14 according to a power control signal from controller 10.

The controller 10 controls the overall operations of the paging receiver. In particular, controller 10 performs the paging service according to various data provided from decoder 12, and controls the power supplied to RF receiver 14. A display 16, under the control of controller 10, displays incoming messages and the various statuses generated in the process of the paging service. An alarm 18, under the control of controller 10, generates an alarm signal upon receiving an incoming message.

Figure 3:
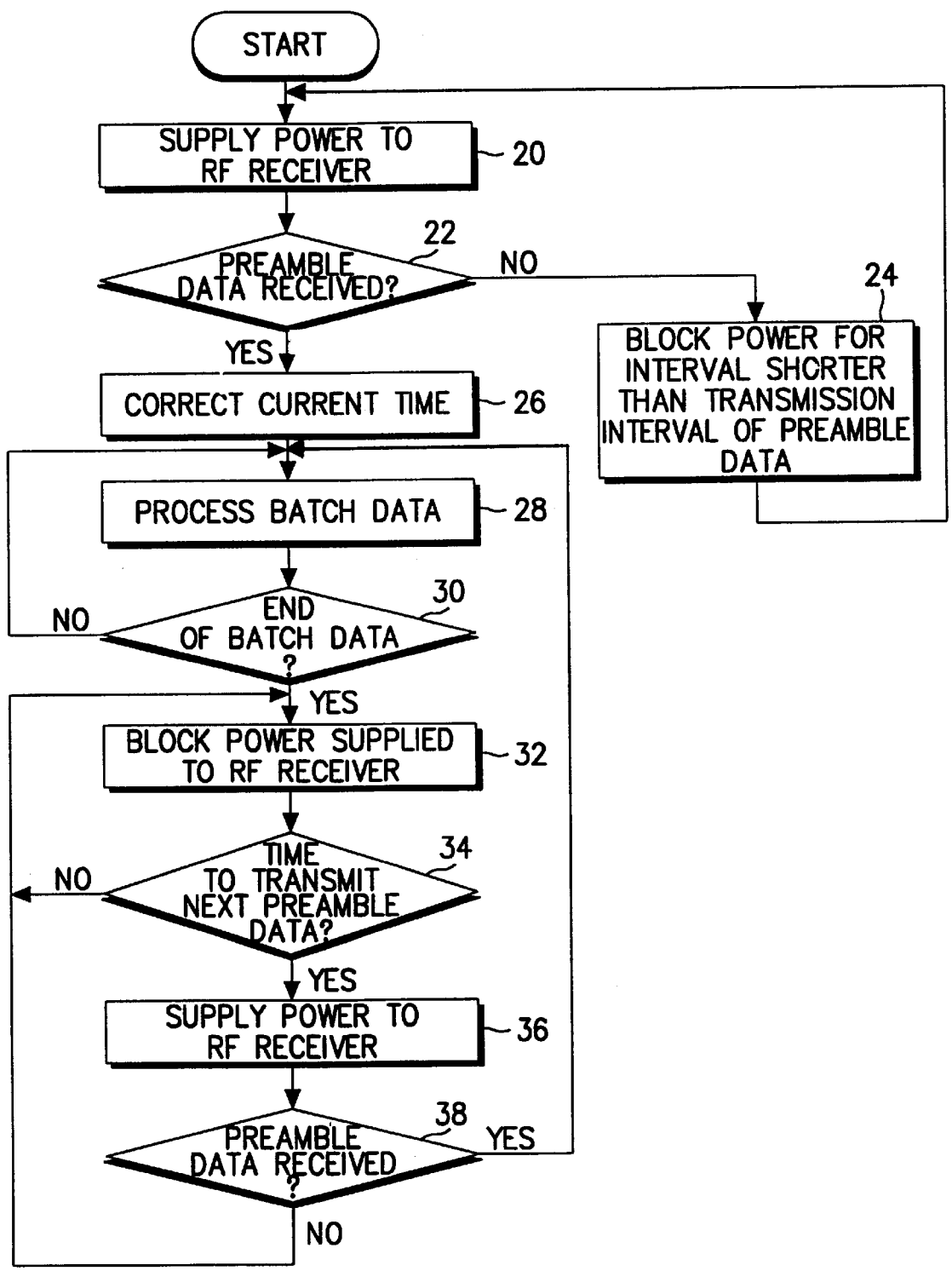
FIG. 3 is a flow chart illustrating a method for controlling the power supplied to an RF receiver in a paging receiver according to an embodiment of the present invention.

FIG. 3 is a flow chart illustrating a method for controlling the power supplied to the RF receiver 14 in the paging receiver according to an embodiment of the present invention. When the paging receiver is powered on, controller 10 provides decoder 12 with the power control signal for supplying power to RF receiver 14 (step 20). The decoder 12 connects the power supplying path to RF receiver 14 according to the power control signal. Being supplied with power, RF receiver 14 receives data from the paging system at the specified transmission channel and provides it to decoder 12. The decoder 12 determines whether or not the received data is preamble data. If the received data is preamble data, then such data is provided to controller 10. Here, the time interval during which power is supplied to the RF receiver 14 is set equal to the time interval required for the RF receiver 14 to receive data and for the decoder 12 to determine whether or not the received data is preamble data.

Referring back to FIG. 3, controller 10 checks whether or not decoder 12 is providing preamble data (step 22). If decoder 12 is providing preamble data, then controller 10 proceeds to step 26. However, if decoder 12 is not providing preamble data, then controller 10 provides decoder 12 with the power control signal for blocking the power supplied to RF receiver 14 (step 24). The blocking power control signal is supplied for a time interval (hereinafter "power-off interval") which is less than the transmission time interval of the preamble data from the paging system. That is, the power-off interval is set in consideration of the transmission time interval of the preamble data from the paging system. Thus, according to the power control signal, the decoder 12 disconnects the power supplying path to RF receiver 14 for the power-off interval.

As stated above, the paging receiver is not in sync with the paging system at the initial power-on state of the paging receiver. As a result, controller 10 blocks the power supplied to RF receiver 14 for the power-off interval (which is less than the transmission time interval of the preamble data) and then, supplies the power for the time interval during which the paging receiver can receive data and judge whether or not the received data is preamble data. The controller 10 repeats the steps of blocking and supplying power to RF receiver 14 until preamble data is received. In this way, controller 10 detects the paging data transmitted from the paging system at the initial power-on state.

In the meantime, if preamble data is received, then controller 10 corrects a "current time" in order to synchronize the paging receiver with the paging system (step 26). Here, as to the correction of the current time, controller 10 corrects an error of a previously set time interval which may be set arbitrarily, e.g., −30sec~+29sec. For example, if the time when the paging receiver receives preamble data is XX minutes and 1 second, then the current time has an error of 1 second (i.e., the current time is out of sync by 1 second), since the paging system transmits paging data precisely every minute (i.e., XX minutes, 0 seconds). In this case, the time error of 1 second falls within the time interval of −30sec~+29sec. Accordingly, controller 10 resets the current time to XX minutes and 00 second in order to correct the time error.

After correction of the current time, controller 10 provides decoder 12 with the power control signal for driving RF receiver 14 in the batch mode (step 28). The decoder 12 controls the power supplied to RF receiver 14 according to the power control signal. Operating in the batch mode, the RF receiver 14 provides its output data to decoder 12, which detects the self frame data and the batch data end information from the output data of RF receiver 14. The controller 10 then processes the detected frame data.

In the course of processing the frame data, controller 10 checks whether or not decoder 12 has detected the batch data end information (step 30). If decoder 12 has detected the batch data end information, then controller 10 proceeds to step 32. However, if decoder 12 has not detected the batch data end information, then controller 10 continues to process the frame data.

At step 32, controller 10 provides decoder 12 with the power control signal for blocking the power supplied to RF receiver 14. The decoder 12 cuts off the power supplied to RF receiver 14 according to the power control signal.

While the power to RF receiver 14 is blocked, controller 10 checks whether or not the current time corresponds to the next transmission time, i.e., the time at which the paging system is to again transmit preamble data (step 34). That is, since the paging system transmits paging data precisely every minute, the next transmission time of preamble data is precisely one minute after the corrected current time. If the current time corresponds the next transmission time of preamble data, then controller 10 proceeds to step 36. However, if the current time does not correspond to the next transmission time, then the power supplied to RF receiver 14 remains blocked until the next transmission time.

At step 36, controller 10 provides decoder 12 with the power control signal for supplying power to RF receiver 14. The decoder 12 connects the power supplying path to RF receiver 14 according to the power control signal. Being supplied with power, RF receiver 14 receives the data transmitted from the paging system and provides such data to decoder 12. The decoder 12 then checks whether or not the received data is preamble data and if so, provides the received data to controller 10.

While RF receiver 14 is being supplied with power, controller 10 checks whether or not decoder 12 is providing preamble data (step 38). If decoder 12 is providing preamble data, then controller 10 proceeds to step 28 in order to process the corresponding data. However, if decoder 12 is not providing preamble data, then controller 10 proceeds to step 32 in order to block the power supplied to RF receiver 14 until the current time equals the next transmission time of preamble data.

As described above, once the paging receiver is synchronized with the paging system, controller 10 supplies power to RF receiver 14 in sync with the cycle in which the paging system transmits paging data. Then, controller 10 blocks the power supplied to RF receiver 14 in sync with the batch data end information of the paging data. As a result, controller 10 supplies power to RF receiver 14 only while the paging system is transmitting paging data.

In sum, upon power-up, the paging receiver according to the present invention checks whether or not paging data is received for a time interval which is shorter than the transmission time interval of preamble data. Once the paging data is initially received, the paging receiver supplies power to the RF receiver in sync with the paging system. That is, power is supplied to the RF receiver for only as long as the paging system transmits paging data. In this manner, the paging reeceiver of the invention minimizes power consumption.

Figure 4:
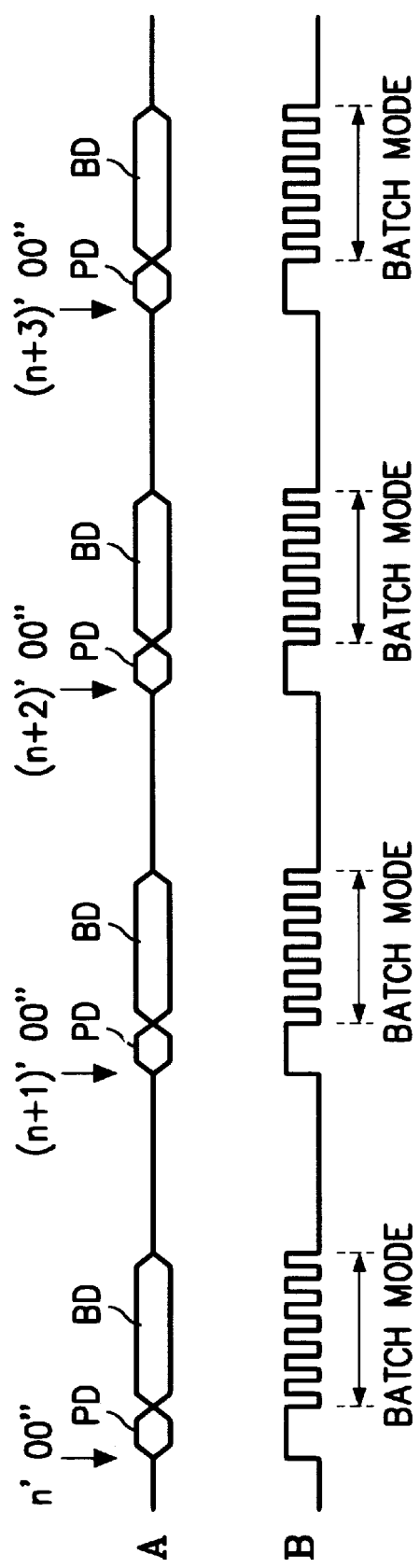
FIG. 4 shows are waveform diagrams illustrating paging data (section A), and the state of the power supplied to an RF receiver in a paging receiver (section B), according to an embodiment of the present invention.

As illustrated in section A of FIG. 4, the paging system transmits paging data, consisting of preamble data PD and batch data BD, precisely every minute. The paging receiver supplies power to the RF receiver precisely every minute and then, cuts off the power supplied to the RF receiver at the time point where the end of the batch data is detected. This is shown in section B of FIG. 4, which is a waveform diagram illustrating the state of the power supplied to the RF receiver according to the present invention. The high state of the waveform represents the power supplying interval and the low state represents the power blocking interval.

As described above, the paging receiver of the invention supplies power to the RF receiver only when the paging system transmits paging data, thereby minimizing unnecessary power consumption. Further, since the paging receiver corrects the current time in sync with the paging system, it can prevent an out-of-sync condition of the current time.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for controlling power supplied to an RF (Radio Frequency) receiver in a paging receiver, comprising the steps of:

a) pre-establishing a paging transmission time interval between all subsequent transmissions of paging data, said paging data comprising preamble data followed by batch data;

b) synchronizing a paging system so that it transmits all said paging data at the pre-established paging transmission time intervals;

c) supplying power to the RF receiver for a test time interval, said test time interval being long enough to allow the RF receiver to receive data from the paging system and to allow a determination to be made whether the received data is preamble data;

d) synchronizing the paging receiver with the pre-established paging transmission time intervals of the paging system, when the received data is the preamble data; and e) supplying the power to the RF receiver at the pre-established paging transmission time intervals in order to receive the paging data, after the paging receiver has been synchronized with the paging system.

2. The method of claim 1, wherein said supplying step (c) further comprises the steps of:

blocking the power to the RF receiver for a test block time interval which is less than a transmission time interval of the preamble data; and alternating between said steps of supplying and blocking the power until it is determined that the received data is preamble data, upon power-up of the paging receiver.

3. The method of claim 1, wherein said synchronizing step (d) further comprises the step of:

correcting a current time associated with the paging receiver.

4. The method of claim 3, wherein the current time is corrected to correlate the current time and the pre-established paging transmission time intervals during which the paging system periodically transmits the paging data.

5. The method of claim 1, further comprising the steps of:

f) detecting self frame data from batch data following the preamble data to process the detected frame data; and g) detecting the end of the batch data.

6. A method for controlling a power supplied to an RF receiver in a paging receiver, comprising the steps of:

a) pre-establishing a paging transmission time interval between all subsequent transmissions of paging data, said paging data comprising preamble data followed by batch data;

b) synchronizing a paging system so that it transmits all said paging data at the pre-established paging transmission time intervals;

c) upon power-up of the paging receiver, repeatedly supplying and blocking the power to the RF receiver for a test and a test block time interval, respectively;

d) determining whether preamble data is being received, when the power is being supplied to the RF receiver in step (c);

e) synchronizing, if it is determined in step (d) that preamble data is being received, the paging receiver with the pre-established paging transmission time intervals of the paging system;

f) detecting, if it is determined that preamble data is being received, self frame data from batch data following the preamble data to process the detected self frame data;

g) checking, if it is determined that preamble data is being received, whether information indicating an end of the batch data is being received; and h) cutting off the power supplied to the RF receiver, when the information of step (g) is received.

7. The method of claim 6, wherein the test time interval is long enough to allow the RF receiver to receive data from the paging system and to allow a determination to be made whether the received data is the preamble data.

8. The method of claim 6, wherein the test block time interval is less than a transmission time interval of the preamble data.

9. The method of claim 6, further comprising the steps of:

periodically supplying the power to the RF receiver at the pre-established paging transmission time intervals;

determining whether the RF receiver is receiving preamble data, when the RF receiver is being periodically supplied with the power; and repeating steps (f) through (h), when the RF receiver is receiving the preamble data.

10. A method for controlling power supplied to an RF (Radio Frequency) receiver in a paging receiver, said paging receiver receiving paging data, said paging data comprising preamble data followed by batch data, comprising the steps of:

a) pre-establishing a paging transmission time interval between all subsequent transmissions of paging data;

b) synchronizing the paging receiver with a paging system which periodically transmits paging data at established paging transmission time intervals;

c) periodically supplying power to the RF receiver at the established paging transmission time intervals;

d) determining whether the RF receiver is receiving preamble data, when the RF receiver is being supplied with power;

e) detecting self frame data from the batch data, when the RF receiver is receiving preamble data;

f) checking whether information indicating an end of the batch data is being received; and g) cutting off the power supplied to the RF receiver, when the information indicating the end of the batch data is received.

11. A paging receiver comprising:

an RF receiver for receiving paging data transmitted from a paging system which periodically transmits the paging data at pre-established paging transmission time intervals, the paging data including preamble data followed by batch data;

a decoder for decoding the received paging data;

a means for connecting/disconnecting a power supplying path to said RF receiver according to a power control signal; and a controller for processing the decoded paging data, for synchronizing the paging receiver to the paging system, and for generating the power control signal so that power is supplied to the RF receiver at the pre-established paging transmission time interval and the power is blocked when an end of the batch is detected; synchronizing the paging system so that it transmit all said paging data at the pre-established paging transmission time interval; supplying power to the RF receiver for a test time interval, said test time interval being long enough to allow the RF receiver to receive data from the paging system and to allow a determination to be made whether the received data is preamble data; and synchronizing the paging receiver with the pre-established paging transmission time interval of the paging system, when the received data is the preamble data.

* * * * *